3,012,006
FLUORINATED ALKYL SILANES AND THEIR USE
George W. Holbrook and Omar W. Steward, Midland, Mich., assignors to Dow Corning Corporation, Midland, Mich., a corporation of Michigan
No Drawing. Filed Apr. 24, 1958, Ser. No. 730,540
11 Claims. (Cl. 260—46.5)

This invention relates to fluorinated alkyl silanes and their use as oil repelling agents.

The water repelling characteristic of organosiloxanes is well known, and these materials are used extensively to render such materials as ceramics, masonry and fibrous materials water repellent. However, the oil repellency of the heretofore employed hydrocarbon substituted siloxanes is not as good as may be desired. That is, although siloxane coated materials are oil resistant, the oil will not stand up on the treated surfaces in droplets as water does. Consequently, it has long been desired to produce siloxanes which have the capacity to render surfaces oil repellent without deleteriously affecting the other desirable properties of siloxanes such as water repellency and hand.

It is the object of this invention to provide novel compositions of matter which are useful as coating compositions. Another object is to provide oil and water repellent articles of manufacture. Other objects and advantages will be apparent from the following description.

This invention relates to a composition of matter comprising a siloxane containing at least 48% by weight fluorine, consisting essentially of siloxane units of the formula $$C_nF_{2n+1}Y_mRSiO$$
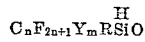

in which $n$ is an integer from 2 to 18 inclusive, R is a divalent aliphatic hydrocarbon radical, $m$ is 0 or 1, Y is a divalent aliphatic radical containing a functional linkage of the group ester, ether, amine and amide, there being a total of less than 18 atoms, exclusive of hydrogen, in Y and R.

The above siloxane compositions are best prepared by hydrolyzing silanes of the formula $$C_nF_{2n+1}Y_mRSiX_2$$
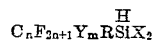

in which $n$, R, Y and $m$ are as above defined, and X is of the group hydrogen atoms, halogen atoms, monovalent hydrocarbonoxy radicals and monovalent halohydrocarbonoxy radicals. The hydrolysis of the silane can be carried out in the conventional manner for hydrolyzing SiH containing silanes. This hydrolysis is best carried out under acid conditions.

The silanes of this invention are best prepared by reacting an olefin containing the above perfluoro group with a silane of the formula $HSiX_3$ at an elevated temperature. If desired, the addition can be carried out in the presence of an addition catalyst such as platinum, platinum salts or peroxides. The reaction may be represented schematically by the equation $$—CH=CH_2 + HSi\equiv \rightarrow —CH_2CH_2Si\equiv$$

In order to simplify the following detailed descriptions of the method of preparing the silanes of this invention various terms and symbols will be employed as follows. Z represents the perfluoro group $C_nF_{2n+1}$. R' represents an aliphatic olefinic radical which when added to the silane becomes the divalent aliphatic radical R. The term "divalent aliphatic radical containing a functional linkage" represented by Y includes three variations. The first is that in which Y is composed entirely of a functional linkage such as the ester linkage,

the amine linkage

or an ether linkage —O—; the second is that in which Y consists of a functional linkage plus a hydrocarbon portion, for example,

and the third is that in which Y consists of one or more hydrocarbon portions and/or more than one functional linkage such as

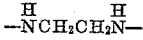

or —$CH_2OCH_2CH_2O$—.

In those cases where there is no functional linkage in the silane, that is where $m$ is 0, the silanes of this invention are prepared by reacting olefins of the formula ZR' with silanes of the formula $HSiX_3$ to give $ZRSiX_3$ in the manner described above. The remaining silanes of this invention are best prepared by reacting functional olefins of the formula ZYR' with silanes of the formula $HSiX_3$ to give $ZYRSiX_3$.

The starting perfluoro olefins ZR' can be prepared from the corresponding perfluoro acids of the formula ZCOOH. These perfluoro acids are known materials and are commercially available. The preparation of the olefin from such acids involves the following steps. The acid ZCOOH is reacted with ethyl alcohol in the presence of sulfuric acid to give the ethyl ester ZCOOEt. This ester is then reacted to about 0° C. with a mixture of methyl magnesium bromide and isopropyl magnesium bromide to give the secondary alcohol $ZCHOHCH_3$. The ratio of reactants employed is one mol ester, one mol methyl magnesium bromide and 1.25 to 1.5 mols of isopropyl magnesium bromide. This secondary alcohol is then dehydrated by heating to 200 to 300° C. in the presence of $P_2O_5$ to give an olefin of the formula $ZCH=CH_2$.

The starting olefins of the formula ZYR' are prepared by reacting aliphatic unsaturated organofunctional compounds with perfluoro functional compounds of the formula ZB where B represents an organic functional group such as carboxyl, sulfonic acid, acyl chloride, alcohol and the like. The reaction of the unsaturated functional compound with the functional perfluoro compound produces unsaturated ethers, esters, amides and amines which are employed to make the silanes of this invention. Typical examples of the preparation of these ZYR' compounds are shown below.

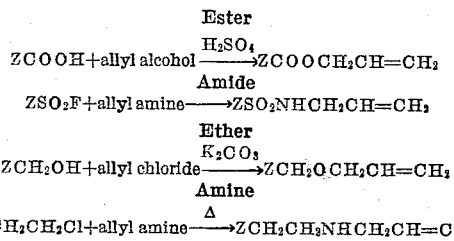

The above starting olefins can be added to starting silanes having from one to four hydrogens attached to the silicon. For example, the starting silane can be $HSiCl_3$, $H_2SiCl_2$, $H_3SiCl$ or $SiH_4$.

The most desirable starting silanes are those of the formula $H_2SiX_2$ in which X is halogen or hydrocarbonoxy, that is —OR″ where R″ is a monovalent hydrocarbon or halogenated monovalent hydrocarbon. When the addition of the olefins to this type of silane is carried out employing an excess of silane good yields of the mono addition product are obtained to give the silanes containing one hydrogen on the silicon. These products can then be hydrolyzed directly to the siloxanes of this invention by conventional methods.

However, it is not essential that the starting silane contain two or more silicon-bonded hydrogen atoms. If desired, silicon-bonded hydrogen can be introduced into the silanes after addition of the olefin to the silane. This can be done by the following series of reactions:

The olefin is added to a trihalosilane of the type $HSiX_3$. The resulting addition product is then reduced with lithium aluminum hydride to produce a silane of the formula $ZY_mRSiH_3$. This silane is then reacted with 2 mols of an alcohol in the presence of chloroplatinic acid to give a silane of the formula $$ZY_mRSi(OR'')_2^H$$

The latter is then hydrolyzed in the conventional manner for hydrolyzing hydrocarbonoxy silanes to give the siloxanes of this invention. The hydrolysis is best carried out under acid conditions.

In the siloxanes and silanes of this invention the perfluoro group Z can be any perfluoro aliphatic group containing from 2 to 18 carbon atoms such as pentafluoroethyl, heptafluoropropyl, nonafluorobutyl and $C_{18}F_{37}$. It should be understood that these perfluoro groups can be either linear or branched in structure. Thus, for example, the perfluoro group Z can be of the type

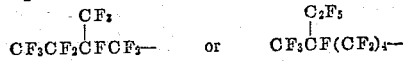

Y can be any divalent aliphatic radical containing at least one functional group of the type ester, ether, amine and amide. Specific examples of ester functional linkages are those derived from carboxylic acids and sulfonic acids or their equivalents, the corresponding acylhalides or acid anhydrides. Specific examples of amide linkages are those derived from either primary or secondary amines and carboxylic acids or sulfonic acids. Specific examples of Y groups which are within the scope of this invention are

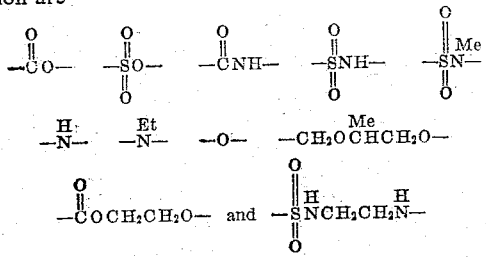

In the compositions of this invention R can be any divalent aliphatic hydrocarbon radical of less than 18 carbon atoms. Specific examples of R are saturated radicals such as ethylene, propylene, undecylene and unsaturated aliphatic divalent hydrocarbon radicals such as vinylene and $(CH_2)_5CH=CH(CH_2)_3—$. The compounds in which R is an unsaturated radical can be prepared by adding any of the above perfluoro compounds containing either two olefinic linkages or one or more acetylenic linkage. For example, one may react a compound of the formula $ZC\equiv CH$ with the silane to give $ZCH=CHSi\equiv$. One also may add a diolefinic derivative such as $ZYCH_2CH=CHCH_2CH=CH_2$ to the silane to produce $ZYCH_2CH=CHCH_2CH_2CH_2Si\equiv$.

Compounds of the type $ZC\equiv CH$ can be prepared by adding HBr to $ZCH=CH_2$ to give $ZCH_2CH_2Br$ which is then brominated by heating in the presence of ultraviolet light to give $ZCH_2CHBr_2$ which is dehydrohalogenated by heating in the presence of alcoholic KOH to give $ZC\equiv CH$.

In the silanes of this invention the X groups can be hydrogen or any halogen atom such as fluorine, chlorine, bromine or iodine, or any hydrocarbonoxy radical of the formula $OR''$ in which $R''$ is any monovalent hydrocarbon radical such as methyl, ethyl, propyl, octadecyl, vinyl, allyl, hexenyl, cyclohexyl, cyclopentyl, cyclohexenyl, pheny, tolyl, xylyl, benzyl or xenyl; or any haogenated monovalent hydrocabon radical such as chloropropyl, chloromethyl, bromophenyl, fluorotolyl or chlorocyclohexyl. Preferably the OR'' groups are alkoxy groups of less than 10 carbon atoms such as methoxy, 2-ethylhexoxy, ethoxy or isopropoxy.

The siloxanes of this invention are particularly useful as a coating agent for base members in order to render them both oil and water repellent. In order for the composition to function successfully as an oil repellent coating the percent by weight fluorine in the siloxane should be at least 48%. The compositions can be applied to the base member in any suitable fashion such as by dipping, spraying or brushing. They also may be applied to the base member as such or in the form of solutions or aqueous emulsions.

In order to facilitate the curing of the siloxane on the base member, it is desirable to employ a curing catalyst. Any catalyst which is normally employed for curing hydrogen containing siloxanes is operative herein. These catalysts are well known and include salts of carboxylic acids such as zinc octoate and dibutyltindiacetate, alkanol amine titanates such as triethanol amine titanate, alkanol amine zirconates such as triethanol amine zirconate, water soluble zirconium compounds such as zirconium acetate and zirconium oxychloride and zirconium or titanium esters of aliphatic alcohols.

The compositions of this invention can be employed on any kind of base member such as those made from glass, ceramics, metal, wood, or fibrous materials such as leather, paper and textiles made from wool, cotton, nylon, cellulose acetate, Dacron and the like.

After the siloxane has been applied to the base member it is desirable to cure the siloxane. This may be done by heating at an elevated temperature such as from 100 to 150° C. or higher or by aging at room temperature in those cases where the base member will not withstand prolonged heating. It should be understood that the siloxane may be applied to the base member per se or it may be formed in situ on the base member by contacting the base member with the silanes of this invention. As is well known, such silanes hydrolyze on the surface of the base member to produce the siloxanes.

The term "consisting essentially of" as employed in the claims means that the siloxanes are essentially of the structure indicated. However, this term includes within the scope of the claims copolymers of the defined siloxanes with minor amounts of hydrocarbon substituted siloxanes which are often employed in connection with SiH containing siloxanes in order to stabilize the products. Examples of such siloxanes are the triorganosilyl substituted siloxanes such as trimethylsiloxane, phenyldimethylsiloxane, triethylsiloxane and siloxanes of the type

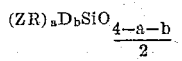

in which D is a hydrocarbon radical and the sum of $a$ and $b$ is equal to 3. The term also includes the presence of minor amounts of diorganosiloxane, monoorganosiloxane or $SiO_2$ units in the polymers. In all events, however, the fluorine content of such siloxane copolymers should total at least 48% by weight.

The following abbreviations are employed in this specification: Me for methyl, Et for ethyl and Ph for phenyl.

The following examples are illustrative only and should not be construed as limiting the invention which is properly delineated in the appended claims.

*Example 1*

A mixture of 249 g. of 1,1-dihydroperfluorooctanol, 112 g. of allyl bromide and 171 g. of anhydrous potassium carbonate was mixed with 300 ml. of acetone and refluxed for 3½ days. The reaction mixture was filtered to remove salts and the acetone was removed by distillation. 100 ml. of benzene were added to the residue and the solution was washed with water and dried by azeotropic distillation. The product was then fractionated to obtain allyl-1,1-dihydroperfluorooctylether, boiling point 177.8 to 178.1° C. at 745 mm., $n_D^{25}$ 1.3202, $d_4^{25}$ 1.561.

A mixture of 94.7 g. of the allyl-1,1-dihydroperfluorooctylether and .3 ml. of a solution of chloroplatinic acid in dimethylcarbitol containing .00122 g. of Pt per ml., was heated to 90° C. while 33.9 g. of trichlorosilane was slowly added. After all the trichlorosilane was added the mixture was refluxed for 8 hours. The resulting product was distilled to give 3-(1,1-dihydroperfluorooctoxy)-propyltrichlorosilane, boiling point 125° C. at 7.5 mm., $n_D^{25}$ 1.3613, $d_4^{25}$ 1.609.

73.2 g. of 3-(1,1-dihydroperfluorooctoxy)propyltrichlorosilane were dissolved in 100 ml. of anhydrous ether and then added to 9.5 g. of lithium aluminum hydride dissolved in 200 ml. of anhydrous ether. The mixture was allowed to stir overnight. Trimethylchlorosilane was added to destroy the excess lithium aluminum hydride. After stirring for 4 hours the reaction mixture was poured onto cracked ice. The ether layer was removed and dried over calcium sulfate and the product was then distilled to give 3-(1,1-dihydroperfluorooctoxy)propylsilane [$C_7F_{15}CH_2O(CH_2)_3SiH_3$], boiling point 83° C. at 9 mm., $n_D^{25}$ 1.3350 and $d_4^{25}$ 1.458.

8.5 g. of absolute ethanol were added to a mixture of 43.8 g. of 3-(1,1-dihydroperfluorooctoxy)propylsilane, .3 ml. of a solution of chloroplatinic acid in dimethylcarbitol which solution contained .00122 g. of Pt per ml., and 100 ml. of anhydrous ether. The reaction mixture was stirred overnight and distilled to give 3-(1,1-dihydroperfluorooctoxy)propyldiethoxysilane

boiling point 115 to 116° C at 4 mm., $n_D^{25}$ 1.3493, $d_4^{25}$ 1.388.

33.5 g. of 3-(1,1-dihydroperfluorooctoxy)propyldiethoxysilane were added to 200 ml. of .01 N hydrochloric acid. The mixture was stirred for ½ hour and 100 ml. of methyl isobutyl ketone were added. The ketone layer separated and was dried by azeotropic distillation. The remaining solvent and alcohol formed during hydrolysis was removed by heating at reduced pressure and the residue was a fluid polymer of 3-(1,1-dihydroperfluorooctoxy)propylpolysiloxane having the unit formula

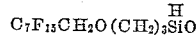

and having $n_D^{25}$ 1.3507 and $d_4^{25}$ 1.631.

2 g. of this siloxane and .3 g. of a mixture of a toluene solution of zinc octoate and dibutyltindiacetate, which solution contained 9.35% by weight zinc and 3.28% by weight tin, were dissolved in ether to give 100 g. of solution. Wool fabric was dipped into this solution, air dried and then heated 15 minutes at 125° C. The fabric was then allowed to stand at room temperature. The pickup was 2% by weight silicone.

The oil repellency of the fabric was tested by measuring the time required for a drop of commercial lubricating oil to soak into the fabric. This test was made periodically after the sample had aged at room temperature for the times shown below.

| Time aging in days | Time in minutes for oil to soak in |
| --- | --- |
| Blank | <1 |
| 2 | 3 |
| 5 | 6 |
| 12 | 105 |
| 16 | 225 |
| 22 | 420 |
| 32 | >24 hrs.[1] |
| Blank | <1 [1] |

[1] White mineral oil.

In all cases the wool samples showed excellent water repellency.

Example 2

A mixture of 297 g. of $C_7F_{15}CH=CH_2$ and 60 g. of dichlorosilane was heated in an autoclave at 250° C. for 6 hours. The resulting product was distilled to give the silane

boiling point 99° C. at 10 mm.

This chlorosilane was dissolved in diethylether and added dropwise to a large excess of water at 15 to 20° C. The siloxane layer was separated from the water, washed neutral and dried. The product was stripped to give a fluid polysiloxane having the unit formula

This polysiloxane was dissolved in ether along with the siloxane catalysts of Example 1 and applied to wool. The pickup was 2%. The wool fabric was heated 15 minutes at 120° C. The oil repellency of the cured sample was then determined as shown in Example 1. The sample was then dry cleaned twice and the oil repellency after each dry cleaning was determined in the same manner. The fabric was allowed to stand for 31 days and it was again dry cleaned and the oil repellency determined. Finally the oil repellency was again determined after 638 days. The results are shown in the table below. The treated wool showed excellent water repellency.

| Dry cleaned | Time aging in days at room temperature | Time in minutes for oil to soak in |
| --- | --- | --- |
| | Blank | <1. |
| 1 | 0 | 3. |
| 2 | | 11. |
| | | 25. |
| 3 | | 150. |
| | 31 | >1 week. |
| | 638 | |

Excellent oil and water repellency was also shown when this siloxane was applied to cotton fabric.

Example 3

167 g. of the olefin $C_3F_7CH=CH_2$ were mixed with 230.5 g. of trichlorosilane and heated in an autoclave for 16 hours at 240 to 250° C. The product was distilled to give 2-(pentafluoropropyl)ethyltrichlorosilane $$(C_3F_7CH_2CH_2SiCl_3)$$

boiling point 143° C. at 740 mm.

47 g. of this silane were mixed with 4.5 g. of lithium aluminum hydride in anhydrous diethylether at 0° C. The mixture was stirred for 1 hour and the excess lithium aluminum hydride was decomposed with ethanol. The ether solution was washed with cold water and dried over calcium sulfate. The product was distilled to give 2-(heptafluoropropyl)ethylsilane ($C_3F_7CH_2CH_2SiH_3$), boiling at 72° C. at atmospheric pressure and having a refractive index at 25° C. of 1.3145.

7.1 g. of absolute ethanol were added to a solution of 17.1 g. of 2-(heptafluoropropyl)ethylsilane and 5 drops of a dimethylcarbitol solution of chloroplatinic acid containing .00122 g. of Pt per ml., in 100 ml. of ether. The mixture was stirred overnight and distilled to give the silane 2-(heptafluoropropyl)ethyldiethoxysilane

boiling 83° C. at 52 mm. and having $n_D^{25}$ 1.3445.

This silane was then hydrolyzed by adding it to 1 N hydrochloric acid. The hydrolyzate mixture was extracted with diethylether and the ether solution was washed neutral and dried. The solvent was removed and there was obtained a fluid polysiloxane having the unit formula $$C_3F_7CH_2CH_2\overset{H}{\underset{}{Si}}O$$

This siloxane was applied to wool fabric in a manner identical with the siloxane of Example 1. The resulting treated wool sample was allowed to age at room temperature for the time indicated below. The oil repellency of this sample was tested with commercial lubricating oil and with white mineral oil as shown in Example 1. The results are given in the table below.

| Time aging in days at room temperature | Time in minutes for oil to soak in |
|---|---|
| Blank | <1. |
| 2 | 1. |
| 5 | 1⅓. |
| 12 | 6. |
| 16 | 7. |
| 22 | 14. |
| 32 | 13. |
| 32 | >24 hrs.[1] |

[1] White mineral oil.

These samples showed excellent water repellency.

Example 4

Good oil repellency is obtained when the siloxane of Example 1 is applied in accordance with the method of that example to the following base members: glass, leather, paper, wood and to textiles of linen, nylon, polyester fibers of terephthalic acid and ethylene glycol, polyacrylonitrile fibers and cellulose acetate fibers.

Example 5

When the following fluoroolefins are added to the silanes shown by heating a mixture of the two in the presence of chloroplatinic acid as shown in Example 1 and the resulting silane is converted to a siloxane as shown in Examples 1 or 2, fluid siloxanes of the following unit formulae are obtained.

in which $n$ is an integer from 2 to 18 inclusive, Y is a divalent aliphatic radical containing a functional linkage of the group consisting of ester, ether, amine and amide linkages, said Y group being linked to both a carbon of the R group and a carbon of the $C_nF_{2n+1}$ group, $m$ is a number of the group consisting of 0 and 1 and R is a divalent aliphatic hydrocarbon radical, there being a total of less than 18 atoms, exclusive of hydrogen, in Y and R and (2) thereafter curing the siloxane coating.

2. A method comprising (1) applying to a base member selected from the group consisting of ceramic, metal and organic fibrous materials a coating of polysiloxane of the unit formula $$C_nF_{2n+1}CH_2CH_2\overset{H}{\underset{}{Si}}O$$

in which $n$ is an integer from 2 to 18 inclusive which polysiloxane contains at least 48 percent by weight fluorine and (2) thereafter curing the siloxane coating.

3. An article of manufacture prepared in accordance with claim 1.

4. An article of manufacture prepared in accordance with claim 2.

5. A composition of matter comprising a silane of the formula $$C_nF_{2n+1}YR\overset{H}{\underset{}{Si}}X_2$$

in which $n$ is an integer from 2 to 18 inclusive, Y is a divalent aliphatic radical containing a functional linkage of the group consisting of ester, ether, amine, and amide linkages, said Y group being linked to both a carbon of the R group and a carbon of the $C_nF_{2n+1}$ group, R is a divalent aliphatic hydrocarbon radical, there being a total of less than 18 atoms, exclusive of hydrogen, in Y and R, and X is selected from the group consisting of hydrogen atoms, halogen atoms, monovalent hydrocarbonoxy radicals and monovalent halohydrocarbonoxy radicals there being sufficient carbon-bonded fluorine in said silane that the corresponding siloxane contains at least 48 percent by weight carbon-bonded fluorine.

| Olefin | Silane | Silane addition product | Unit formulae of siloxane |
|---|---|---|---|
| $C_3F_7C\equiv CH$ | $H_2SiCl_2$ | $C_3F_7CH=CH\overset{H}{Si}Cl_2$ | $C_3F_7CH=CH\overset{H}{Si}O$. |
| $C_7F_{15}COOCH_2CH=CH_2$ | $SiH_4$ | $C_7F_{15}COO(CH_2)_3SiH_3$ | $C_7F_{15}COO(CH_2)_3\overset{H}{Si}O$. |
| $C_7F_{15}SO_2OCH_2CH=CH_2$ | $HSiBr_2$ | $C_7F_{15}SO_2O(CH_2)_3\overset{H}{Si}Br_2$ | $C_7F_{15}SO_2O(CH_2)_3\overset{H}{Si}O$. |
| $C_7F_{15}SO_2NHCH_2CH=CH_2$ | $H_2SiF_2$ | $C_7F_{15}SO_2NH(CH_2)_3\overset{H}{Si}F_2$ | $C_7F_{15}SO_2NH(CH_2)_3\overset{H}{Si}O$. |
| $C_7F_{15}CONHCH_2CH=CH_2$ | $HSiCl(OC_4H_8Cl)_2$ | $C_7F_{15}CONH(CH_2)_3SiCl(OC_4H_8Cl)_2$ | $C_7F_{15}CONH(CH_2)_3\overset{H}{Si}O$. |
| $C_8F_{17}CH_2CH_2NHCH_2CH=CH_2$ | $H_2SiCl_2$ | $C_8F_{17}CH_2CH_2NH(CH_2)_3\overset{H}{Si}Cl_2$ | $C_8F_{17}CH_2CH_2NH(CH_2)_3\overset{H}{Si}O$. |
| $C_{18}F_{37}CH_2OOC(CH_2)_8CH=CH_2$ | $H_2SiCl_2$ | $C_{18}F_{37}CH_2OOC(CH_2)_{10}SiCl_2$ | $C_{18}F_{37}CH_2OOC(CH_2)_{10}\overset{H}{Si}O$. |
| $C_8F_{17}CH_2O\overset{Me}{C}HCH_2OCH_2CH=CH_2$ | $H_2SiCl_2$ | $C_8F_{17}CH_2O\overset{Me}{C}HCH_2O(CH_2)_3\overset{H}{Si}Cl_2$ | $C_8F_{17}CH_2O\overset{Me}{C}HCH_2O(CH_2)_3\overset{H}{Si}O$. |
| $C_8F_{17}CONHCH_2CH_2\overset{Me}{N}CH_2CH=CH_2$ | $H_2SiCl_2$ | $C_8F_{17}CONHCH_2CH_2\overset{Me}{N}(CH_2)_3\overset{H}{Si}Cl_2$ | $C_8F_{17}CONHCH_2CH_2\overset{Me}{N}(CH_2)_3\overset{H}{Si}O$. |

Each of the above siloxanes is suitable for rendering fabrics oil repellent.

That which is claimed is:

1. The method comprising (1) applying to a base member selected from the group consisting of ceramic, metal and organic fibrous materials a coating of siloxane containing at least 48% by weight fluorine and consisting essentially of siloxane units of the formula $$C_nF_{2n+1}Y_mR\overset{H}{\underset{}{Si}}O$$

6. A composition of claim 5 in which X is an alkoxy radical of less than 10 carbon atoms.

7. As a composition of matter a siloxane containing at least 48% by weight fluorine and consisting essentially of siloxane units of the formula $$C_nF_{2n+1}YR\overset{H}{\underset{}{Si}}O$$

in which $n$ is an integer from 2 to 18 inclusive, Y is a divalent aliphatic radical containing a functional linkage of the group consisting of ester, ether, amine and amide linkages, said Y group being linked to both a carbon of the R group and a carbon of the $C_nF_{2n+1}$ group and R is a divalent aliphatic hydrocarbon radical, there being a total of less than 18 atoms, exclusive of hydrogen, in Y and R.

8. A polysiloxane of the unit formula $$C_nF_{2n+1}YCH_2CH_2CH_2\overset{H}{\underset{}{Si}}O$$

in which $n$ is an integer from 2 to 18 inclusive and Y is a divalent aliphatic radical containing a functional linkage selected from the group consisting of ester, ether, amine and amide linkages, said Y groups being linked to both a carbon of the $-CH_2CH_2CH_2-$ group and carbon of the $C_nF_{2n+1}$ group said siloxane containing at least 48 percent by weight fluorine.

9. A method comprising (1) applying to a base member selected from the group consisting of ceramic, metal and organic fibrous materials a coating of polysiloxane of the formula $$C_nF_{2n+1}YCH_2CH_2CH_2\overset{H}{\underset{}{Si}}O$$

in which $n$ is an integer from 2 to 18 inclusive and Y is a divalent aliphatic radical containing a functional linkage selected from the group consisting of ester, ether, amine and amide linkages, said Y group being linked to both a carbon of the $-CH_2CH_2CH_2-$ group and carbon of the $C_nF_{2n+1}$ group and thereafter curing the polysiloxane.

10. An article of manufacture prepared in accordance with claim 9.

11. As a composition of matter $$C_7F_{15}CH_2CH_2\overset{H}{\underset{}{Si}}Cl_2$$

References Cited in the file of this patent
UNITED STATES PATENTS

| | | |
|---|---|---|
| 2,386,259 | Norton | Oct. 9, 1945 |
| 2,789,956 | Eder | Apr. 23, 1957 |
| 2,800,494 | Haluska | July 23, 1957 |
| 2,838,423 | Gilkey | June 10, 1958 |

FOREIGN PATENTS

| | | |
|---|---|---|
| 1,090,847 | France | Oct. 20, 1954 |

OTHER REFERENCES

McBee et al.: Jour. of the American Chem. Society, vol. 79, May 1957, pp. 2329–2332.

Clark, R. T.: "Elastomeric Fluoroalkyl Siloxane Copolymers," WADC Technical Report 54–213, July 1957, pp. III and 18 relied on.